United States Patent Office 3,450,816
Patented June 17, 1969

3,450,816
STERILIZATION OF FEMALE MOSQUITOES WITH A HORMONE DERIVED FROM MALE MOSQUITOES
George B. Craig, Jr., and Morton Fuchs, South Bend, Ind., assignors to the United States of America as represented by the Secretary, Department of Health, Education, and Welfare
No Drawing. Filed Nov. 28, 1967, Ser. No. 686,336
Int. Cl. A01n *9/00, 23/00;* C07q *17/00*
U.S. Cl. 424—95                                      4 Claims

ABSTRACT OF THE DISCLOSURE

A method of sterilizing female mosquitoes with a substance extracted from the accessory glands of male mosquitoes, the method of extracting and purifying the substance, and the purified material, named "matrone." Matrone is obtained from the male terminalia by extraction with saline solution or, alternatively, by extracting whole male bodies with organic solvents, followed by extraction of matrone with saline solution. Matrone can be lyophilized and stored. Female mosquitoes to which matrone has been administered by injection or feeding are sterilized for life.

---

This invention relates to a composition and a method for the control of insects, and more particularly for the control of mosquitoes.

It is well known that various insects such as mosquitoes, flies, ticks and mites, to name just a few, are carriers of diseases which have plagued mankind through the ages. The earliest, and most successful methods of disease prevention through insect control have utilized insecticides of one type or another. The disadvantages accompanying the use of insecticides are well known due to the increased publicity in that area in recent years. It has been found that many of the commonly used insecticides have an extremely toxic effect to wild life, to vegetation, and to humans. The toxicity of several such chemicals has only recently been demonstrated since it involves a cumulative effect and is not immediately obvious. The important, and tragic consequences of these various chemicals has taken on new importance with the discovery that ecological imbalances have resulted. The persistent and environmental contamination of many extremely toxic insecticides has also become a cause for public alarm. Another, extremely important discovery, has been that many insects gradually become resistant to specific insecticides, thereby creating the need for using progressively stronger and more dangerous chemicals. The danger accompanying the use of these compounds cannot be underestimated.

Over the last decade considerable research has been performed resulting in various experimental methods of sterilizing specific insects so that, by a natural process of attrition, the insect population would dwindle. Notable success has been achieved in this area using such sterilization methods as radiation as well as the use of chemicals and hormones. There are obvious drawbacks to those methods, not the least of which is finding methods of treating great numbers of insects.

It is, therefore, an object of this invention to provide a composition and a method for the control of insects by sterilization.

It is another, important, object of this invention to provide a compound and a method suitable for widespread dissemination for the control of insects by sterilization.

It is yet another object of this invention to provide a composition and method which will effectively sterilize female mosquitoes, thereby depleting the mosquito population.

It is known that insemination stimulates egg deposition in *Aedes aegypti*. It was shown that the mechanics of mating were not responsible for the stimulus since males which had mated repeatedly and hence had their supply of seminal fluid depleted, failed to stimulate females to oviposit, even after frequent copulation. Later, it was hypothesized that a stimulant substance is produced by the male accessory gland which was responsible for the stimulation of oviposition. In order to prove this hypothesis, experiments were performed in the implantation of male accessory glands into the thorax of virgin females of two species of Aedes, *A. aegypti* and *A. albopictus*.[1] In this work the reproductive tract was extracted from virgin males and the glands were removed therefrom. The glands were then inserted into the thorax of the females and compared with various controls. There was a striking increase in the oviposition of the treated females.

Later work in the field of genetics produced remarkable results. When several males of *Aedes aegypti*, each with a different genetic marker, were placed with a single female, all progeny came from the first male that copulated with the female. This was despite the fact that repeated copulation was observed. Thus, the widely held assumption that a single female can be inseminated by several males was disproved. A further, most unexpected, observation was that although copulation may take place many times, a female mated only once is refractory to subsequent insemination for life. Multiple insemination can take place only when several males copulate with a female in a short period of time.

The agent which stimulates this reaction in females was found to come from male accessory glands and to be passed to the female in seminal fluid. As will be described in more detail hereinbelow, implantations of male accessory glands into the thorax of females of *A. aegypti* was found to inhibit insemination when the females were then exposed to virgin males. This "sterilizing" effect lasts for the entire life of the female. Even though the treated female oviposited, none of the eggs hatched. The mechanism of action of the accessory gland substance in the female has not yet been determined. The sound-in-flight of females with gland implants is fully attractive to males, but such females sometimes avoid copulation by lowering the abdomen to the surface or otherwise preventing the male from assuming the coital position. Males placed with once-mated females often go through the preliminary steps of coitus but fail to ejaculate. In normal coitus in *A. aegypti*, male paraprocts are inserted between the genital lips, opening them and facilitating insertion of the aedeagus. Perhaps the accessory gland stimulates the female to hold the vaginal lips closed. If so, the lips might be breeched occasionally by the mechanical pressure of forced mating but not by the male in the normal act of mating. Certainly, force-mating is much more readily accomplished with virgins than with once-mated females. It has been found that males, force-mated to females with gland implants, seemed to have difficulty in inserting the aedeagus and external ejaculation was fairly frequent. On the other hand, it has been suggested that semen is introduced into the female in second matings but is subsequently expelled due to cuticular changes in the female genital attrium induced by accessory gland substance.

The effect of male accessory substance was similar in *Culex pipiens, Anopheles quadrimaculatus, Aedes aegypti, A. albopictus, A. atropalpus, A. mascarensis, A. poly-*

---
[1] Leahy, M. G., and Craig, G. B., Mosquito News, 25, 448 (1965).

nesiensis, A. scutellaris, A. sierrensis, A. togoi, A. triseriatus, and A. vittatus. Both homologous and heterologous transplants were made, with results that differed only in degree. It was even found that the glands of Drosophila melanogaster afforded protection in A. aegypti, even though multiple insemination is common in D. melanogaster.

Further, it was determined that the male accessory gland substance, which has been named "matrone," could be extracted and purified for administration to females. As will be described in detail below, matrone could be extracted from either the terminalia of the males, or from the complete body and administered in one of several ways. Each male apparently contains enough active matrone to sterilize at least 64 females. In experimental use, a solution of matrone injected into the thorax of a virgin female was found to sterilize the female for life. As a more practical method of dissemination of matrone, it was found that females fed on this substance in sugar solution are also sterilized. It is, therefore, apparent that this substance may be fed to female mosquitoes, thereby sterilizing them for life. Alternatively, matrone could be applied in the food of larvae or it could be applied, as by spraying, on surfaces where newly-emerged mosquitoes may rest.

The invention is further illustrated by the following examples, although it is not intended to be limited thereto.

EXAMPLE I

To establish that the agent which stimulates monogamy in females comes from male accessory glands and is passed to the female in seminal fluid various male tissues were dissected in saline solution and implanted in the thorax of virgin females. The tissues used were male accessory gland, male gut, and testis. Further controls were used with no tissue, but with a sham-operation. After a 24-hour period of recovery, the females were placed in a cage with a surplus of virgin males, where they remained an additional 24 hours. The females were then dissected and examined for sperm in the spermathecae (the sole storage organ for sperm in mosquitoes). As can be seen in Table I, at least 85% of the control females were inseminated, compared to 0% for females with implanted male accessory glands.

TABLE I.—EFFECT OF TRANSPLANTATION OF VARIOUS TISSUES INTO THE THORAX OF VIRGIN FEMALES ON SUBSEQUENT INSEMINATION IN *AEDES AEGYPTI* (ROCK STRAIN)

| Time after implant (females placed with males) (hours) | Females | | |
|---|---|---|---|
| | No. Virgins Implanted | No. Examined* | Inseminated (percent) |
| NO TISSUE (SHAM-OPERATED) | | | |
| 24 | 30 | 28 | 86 |
| TESTIS | | | |
| 24 | 40 | 36 | 89 |
| MALE GUT | | | |
| 24 | 75 | 68 | 85 |
| MALE GLAND | | | |
| 24 | 100 | 86 | 0 |
| 16 | 45 | 43 | 0 |
| 8 | 30 | 26 | 0 |
| 4 | 25 | 22 | 5 |
| 0 | 42 | 42 | 26 |

*Treated females kept with a surplus of males for 24 hours and then dissected and examined for presence of sperm in spermathecae.

Apparently, several hours are required before the sterilizing effect of accessory gland material is accomplished. When females with gland implants were placed with males immediately after operation, 26% were inseminated. 5% of females that were allowed 4 hours for recovery were inseminated, while those given longer periods had complete protection from insemination. The sterilizing effect lasts for the entire life of the female.

EXAMPLE II

In this experiment, glands were implanted in females less than one hour old. Each week for ten weeks, these females received a blood meal and were placed with a new batch of males one to two weeks old. At the end of ten weeks, when 188 females with gland implants were dissected, none was inseminated. In the control with gut implants, 155 to 157 females were inseminated. Some females were isolated individually with 5 males. Repeated blood meals were provided, and each female was placed with 5 fresh males after each oviposition. Each of 5 females with gland implants produced 6 separate egg batches, with total egg production of 357, 314, 292, 275 and 258. None of these eggs hatched. Five females with gut implants also produced six separate batches, giving 327, 302, 300, 249 and 246 eggs. More than 90% of the eggs from each batch were hatchable.

EXAMPLE III

The effect of male accessory gland substance was similar in *Culex pipiens, Anopheles quadrimaculatus*, and ten species of Aedes (*A. aegypti, A. albopictus, A. atropalpus, A. mascarensis, A. polynesiensis, A. scutellaris, A. sierrensis, A togoi, A. triseriatus* and *A. vittatius*). After 24 hours, operated females were exposed to homologous males for 96 hours. Insemination in the controls with gut implants varied from 70% for *Anopheles* to 100% for *C. pipiens*. No insemination occurred in any female with gland implants among the 12 species tested. These results seem to indicate that female monogamy is widespread in mosquitoes.

Heterologous transplants between species gave some protection from insemination, but the effect was less pronounced. For example, 40 females of *A. aegypti* gave the indicated percentage of insemination when implanted with male glands of the following species:

A. atropalpus _____ 15
A. triseriatus _____ 33
Culex pipiens _____ 50
A. scutellaris _____ 63
Drosophila melanogaster _____ 30

With females of *A. triseriatus*, glands of *A. aegypti* gave 8% of those of *A. atropalpus* gave 10%. In females of *Culex pipiens*, glands of *A. albopictus* gave 10%, and those of *A. aegypti* gave 65%. Thus, there is no apparent correlation between phylogenetic position and amount of protection. Even glands of *Drosophila* gave protection in *A. aegypti*, although multiple insemination is common in *D. melanogaster*. Other insects may serve as a source of material which will prevent insemination in mosquitoes. There is even evidence that female monogomy exists in the housefly. In this species, females lose sexual receptivity after injection or implantation of material from the male ejaculatory duct.

EXAMPLE IV

While identification of the active principle in male accessory glands (matrone) of *A. aegypti* has not been completed, extraction and purification have been performed. The following method has been used for the preparation of stock solutions:

(1) The terminalia and abdominal segment VIII of 250 males, preferably virgin and over 4 days old, was placed in 1 ml. of saline;
(2) The mixture was sonicated for 1 minute;
(3) The mixture was then centrifuged for 30 minutes at 4,000 g. and the residue was discarded; and,
(4) The supernatant was frozen for storage.

The assay procedures to determine activity in *A. aegypti* were as follows:
(1) 20 virgin females were anesthetized;
(2) 1 μl. of solution was injected into the thorax of each female;

(3) 24 hours were allowed for recovery, and then the females were placed with 40 males; and (4) 48 hours after injection, the females were dissected and the spermathecae were examined for insemination.

Control females injected with saline generally show 85 to 95% insemination after 24 hours with males.

Two-fold serial dilutions were used to determine activity of stock solution by titration. The results can be seen in Table II.

TABLE II.—ASSAY OF MALE ACCESSORY GLAND ACTIVITY IN *AEDES AEGYPTI* BY INJECTION OF FEMALES WITH SERIAL DILUTIONS OF VARIOUS GLAND PREPARATIONS.

|  | Females Inseminated From Treated Preparation (percent)† | | | |
|---|---|---|---|---|
|  | With solution from males fed on apple | | With solution from males fed on sugar | |
| Dilution injected (1 µl. per female)* | Unfrozen | Frozen and Thawed Ten Times | Unfrozen | Frozen and Thawed Ten Times |
| Full | 0 | 0 | 0 | 0 |
| ½ | 0 | 0 | 0 | 0 |
| ¼ | 0 | 0 | 0 | 10 |
| ⅛ | 0 | 60 | 0 | 50 |
| 1/16 | 0 | 55 | 15 | 70 |
| 1/32 | 35 | 100 | 50 | 95 |
| 1/64 | 45 | 90 | 90 | 85 |
| 1/128 | 90 | 95 | 85 | 100 |

*Stock solution from 250 male terminalia in 1 ml. of saline. Injection of 1 µl. gave a dose equivalent to one-fourth of a pair of male glands.
† Twenty females injected for each dilution, placed with males 24 hours later, and examined for insemination 48 hours after injection.

Glands taken from males fed on slices of canned apple gave slightly more activity than those from males fed on dry sugar cubes. The first column of results in Table II is typical of many other assays of stock solution. Each male apparently contains enough matrone to sterilize at least 64 females. The initial stock solution contained glands from 250 males in 1 ml. of saline. Each female received 1 µl., a dose equivalent to one-half gland or one-fourth of a pair of glands. Thus, the gland material from one male was distributed among four females. The stock solution could be diluted 16 times and yet retain enough activity for complete prevention of insemination.

The stock solution of matrone from *A. aegypti* is clear and colorless, and possesses the following characteristics:

(1) It is stable in cold. Activity is retained indefinitely while the solution is frozen at −20° C. and is reduced only slightly by repeated freezing and thawing. It can be stored frozen or at 5° C.

(2) It is unstable in heat. It was destroyed by 5 minutes at 50° C., but was unaffected by 40° C.

(3) It is pH-sensitive. It is denatured above 10 or below 4.

(4) It is lyophilizable. The lyophilized material can be stored dry at room temperature indefinitely.

(5) It is non-dialyzable.

(6) It is readily precipitated with 50% ammonium sulfate solution.

(7) It is destroyed by amyl alcohol and chloroform.

(8) It is not precipiated, nor affected by manganous chloride.

(9) The molecular weight is estimated to be about 10,000 as measured from Sephadex columns.

These characteristics are consistent with the hypothesis that the substance is a protein, and probably a globulin protein.

EXAMPLE V

The following procedure was used to extract matrone from whole bodies of male *A. aegypti*.

Frozen whole body, five day old adult males were lyophilized to dryness, resulting in a weight reduction of about 40–50%. Fine glass beads were added in an amount equal to the weight of the water lost. Approximately five volumes of acetone at −15° C. was added and the mixture was homogenized in the cold for five minutes.

The homogenate was filtered, the solid material was resuspended in five volumes of n-butanol at −15° C., and the homogenization was repeated. The material was again filtered and the solid material was washed with approximately 100 ml. of acetone at −15° C. on the filter paper. The grayish-brown powder remaining on the filter paper was collected for further processing. This material could be stored in a freezer.

The powder was next suspended in 5–10 volumes of *A. aegypti* physiological saline solution and homogenized for 15 minutes in the cold. The homogenate was centrifuged at 48,000 g. for 20–30 minutes and the precipitate was discarded. It should be noted that these steps should be performed in the cold.

To the cold supernatant, 1/50 volume of 1.0 N manganous chloride was slowly added to remove the nucleic acids as a precipitate. After 4–12 hours the material was again centrifuged as before and the precipitate was discard. Solid ammonium sulfate was dissolved in the supernatant to make a 60% saturated solution. The solution was kept cold for 4–12 hours with stirring and then centrifuged as before and the supernatant was discarded.

The precipitate was redissolved in cold physiological saline and dialyzed overnight in the cold against a large volume (at least 1–2 liters) of saline. The remaining concentrated solution was assayed for activity as described hereinbelow.

EXAMPLE VI

The procedure of Example V was repeated but the final concentrated solution was lyophilized to a dry powder and stored at room temperature.

EXAMPLE VII

The concentrate from Example V was assayed as follows:

(1) Serial dilutions were injected into virgin *A. aegypti* females in a 1 µl. dose;

(2) 24 hours later the females were placed with males;

(3) 48 hours after injection the females were dissected and examined for insemination. The results are shown in Table III for solutions adjusted to different pH levels:

TABLE III

| Dilution | Percent inseminated at pH (N=20 females)* | | | | | | | | |
|---|---|---|---|---|---|---|---|---|---|
|  | 1.5 | 3.0 | 4.3 | 4.9 | 5.2 | 6.8 | 8.7 | 9.5 | 10.2 | 12.0 |
| Full | 75 | 85 | 0 | 0 | 0 | 0 | 0 | 0 | 0 | 90 |
| ½ |  |  | 10 | 0 | 0 | 0 | 0 | 0 | 0 |  |
| ¼ |  |  | 50 | 0 | 0 | 0 | 0 | 0 | 30 |  |
| ⅛ |  |  | 60 | 0 | 0 | 10 | 0 | 10 | 80 |  |
| 1/16 |  |  | 80 | 10 | 75 | 20 | 15 | 85 | 100 |  |
| 1/32 |  |  | 85 | 50 | 90 | 85 | 100 | 75 | 95 |  |

* Stock solution of glands (250 males per ml.) held at given pH for two hours, then dialyzed 12 hours in saline. Whole bodies of males, extracted with acetone-butanol according to the procedure outlined herein, regularly give results similar to those indicated above. Thus, a solution from 250 males in 1 ml. of saline can be diluted at least to ⅓ and give full activity. This means 30 males per ml. gives activity. Stated another way, 3% of one male will give activity or one male has enough hormone to prevent insemination in 33 females.

EXAMPLE VIII

In order to determine the feasibility of administration of matrone in food, the following procedure was followed:

(1) Virgin females were held without water for 24 hours;

(2) A cotton pad soaked with matrone (250 males per ml.) and 10% sucrose was provided for 24 hours;

(3) The females were then placed with males;

(4) A control was run under the same conditions using sucrose alone.

The results were as follows: of 20 females tested, 2 were inseminated; of 20 control females, 20 were inseminated.

Thus, it can be seen that matrone can be administered in food to effectively sterilize female mosquitoes.

Since it has been noted that *A. aegypti* cannot be inseminated until at least 48–50 hours after adult emergence, and ample feeding takes place during this period, simple and inexpensive methods of distribution should prove effective.

It should be understood that "saline solution," as used herein refers to *Aedes aegypti* physiologoical saline solution.

What is claimed is:

1. A method of purifying matrone comprising the steps of:

(a) lyophilizing the whole bodies of male mosquitoes to dryness;

(b) extracting said whole bodies with acetone at about −15° C. to obtain a first residue of impure matrone;

(c) extracting said first residue with n-butanol at about −15° C. to obtain a second residue of impure matrone;

(d) extracting said second residue with *Aedes aegypti* physiological saline solution in the cold to obtain a saline solution of matrone;

(e) adding $\frac{1}{50}$th volume of 1.0 N manganous chloride to remove impurities by precipitation, and separating the resulting precipitate from the resulting supernatant;

(f) adding solid ammonium sulfate to said supernatant to make a 60% saturated solution to remove matrone by precipitation and separating the resulting precipitated matrone from the resulting supernatant; and, (g) redissolving said matrone in cold *Aedes aegypti* physiological saline solution and concentrating the resulting solution by dialysis.

2. The product produced by the method of claim 1.

3. A method in accordance with claim 1, further comprising the steps of:

(h) removing said saline solution of matrone of step (d) from the resulting precipitate by centrifuging; and, (i) performing said separations in steps (e) and (f) by centrifuging.

4. A method according to claim 3, further comprising recovering purified matrone from the concentrated matrone solution of step (g) by lyophilization.

References Cited

Journal of Economic Entomology, vol. 46, No. 4 (1953) pp. 624–626.

Mosquito News, vol. 25, No. 4 (1965) pp. 448–452.

ALBERT T. MEYERS, *Primary Examiner.*

F. E. WADDELL, *Assistant Examiner.*

U.S. Cl. X.R.

424—105